United States Patent [19]

Yokooku et al.

[11] Patent Number: 4,532,905
[45] Date of Patent: Aug. 6, 1985

[54] FUEL INJECTION CONTROL SYSTEM FOR CONTROLLING THE FUEL DISTRIBUTION TO THE CYLINDERS OF A MULTI-CYLINDER INTERNAL COMBUSTION ENGINE

[75] Inventors: Katsuhiko Yokooku; Tadashi Kaneko; Tadataka Nakazumi, all of Hiroshima, Japan

[73] Assignee: Mazda Motor Corporation, Japan

[21] Appl. No.: 582,771

[22] Filed: Feb. 23, 1984

[30] Foreign Application Priority Data

Feb. 24, 1983 [JP] Japan .................................. 58-29989

[51] Int. Cl.³ .......................................... F02M 51/00
[52] U.S. Cl. .................................... 123/443; 123/480; 123/419
[58] Field of Search ................ 123/443, 480, 491, 419

[56] References Cited

U.S. PATENT DOCUMENTS 4,301,780 11/1981 Hoshi .................................. 123/480
4,357,662 11/1982 Schira et al. ........................ 123/419
4,436,073 3/1984 Miyagi ............................... 123/480
4,438,496 3/1984 Ohie .................................. 123/480

FOREIGN PATENT DOCUMENTS 0060335 5/1977 Japan .................................. 123/443
55-12262 1/1980 Japan .

Primary Examiner—Parshotam S. Lall
Attorney, Agent, or Firm—Murray, Whisenhunt and Ferguson

[57] ABSTRACT

A fuel injection valve is provided upstream of a branch-off part of a branched off intake passage, the downstream ends of the branched off passages being connected to a plurality of cylinders of an engine. The fuel injection timing of the injection valve is controlled by a pulse controller. The pulse controller operates to control the pulse timing basically according to the intake air flow and the crank angle of the crank shaft of the engine, and further corrects the timing according to the air fuel ratio difference between cylinders whose intake strokes are adjacent to each other. The correction rate of the timing may be changed according to the degree of the engine load and/or the engine temperature. By the correction of the timing, the air fuel mixture in rich cylinders is partly inhaled into lean cylinders so that the air fuel ratios of the cylinders may be equalized.

14 Claims, 9 Drawing Figures

INTAKE VALVE OPEN ANGLE

CRANK ANGLE STANDARD SIGNAL

STANDARD PULSE

PULSE AT LOW INTAKE

PULSE AT HIGH INTAKE

FUEL INJECTION CONTROL SYSTEM FOR CONTROLLING THE FUEL DISTRIBUTION TO THE CYLINDERS OF A MULTI-CYLINDER INTERNAL COMBUSTION ENGINE

BACKGROUND OF THE INVENTION

1. Field of the Invention

This invention relates to a fuel injection system for engines, and more particularly to a fuel injection system for internal combustion engines in which fuel is supplied to a plurality of cylinders by a single fuel injection valve.

2. Description of the Prior Art

It has been known in the art in the field of fuel injection type engines to supply fuel to a plurality of cylinders by a single injection valve located upstream of a branch-off part of intake passages the downstream ends of which are connected to the plurality of cylinders separately. Such a single point injection type engine is disclosed in Japanese Unexamined Patent Publication No. 55(1980)-12262.

This type of fuel injection system has the following drawbacks due to the branched off intake passages and the change-over of the fuel supply thereto. When the fuel is injected into the plurality of cylinders sequentially in synchronization with the rotation of the engines to conduct injection at the timing of intake stroke, the amount of the fuel actually injected into the cylinders changes according to the length of the intake passages and the intake inertia. Consequently, the air fuel ratio changes according to the position of the cylinders, which badly influences the emission performance.

SUMMARY OF THE INVENTION

In view of the above-mentioned drawbacks inherent in the conventional single point injection system with a plurality of cylinders, the principal object of the present invention is to provide a fuel injection system with a single fuel injection valve and a plurality of cylinders in which the air fuel ratio is made constant for every cylinder, thereby improving the emission performance.

A more specific object of the present invention is to provide a fuel injection system with a single fuel injection valve and a plurality of cylinders in which the timing of fuel injection is controlled in view of the difference in air fuel ratio between cylinders to equalize the air fuel ratio of all the cylinders.

The above-mentioned objects of the present invention are accomplished by controlling the timing of fuel injection according to the difference in air fuel ratio between adjacent cylinders by use of a fuel injection pulse controlling means so that the air fuel ratio may be equalized for all cylinders. In more detail, for example, the timing of the fuel injection for the cylinder to which rich fuel is apt to be introduced is advanced or retarded to make the fuel leaner and make the air fuel ratio equalized for all cylinders.

The fuel injection pulse controlling means may further correct the degree of control of the timing of the fuel injection according to the amount of air intake and/or engine speed to further precisely equalize the air fuel ratio.

More specifically, the fuel injection system for engines in accordance with the present invention comprises a fuel injection valve provided upstream of a branch-off part of intake passages the downstream ends of which are connected with a plurality of cylinders, respectively, an intake air flow detecting means for detecting the amount of air inhaled into the cylinder, a crank angle sensor which generates standard signals at every predetermined crank angle of the engine, and a fuel injection pulse control means which receives signals from said intake air flow detecting means and said crank angle sensor to forward fuel injection pulses of the size proportional to said intake air flow to the cylinders in the intake stroke thereof at timings determined by said standard signals and corrects said timings according to differences in the air fuel ratio between adjacent cylinders in which the intake strokes are adjacent to each other.

DESCRIPTION OF THE PREFERRED EMBODIMENTS

Now the present invention will be described in detail with reference to preferred embodiments thereof referring to the accompanying drawings.

Figure 1:
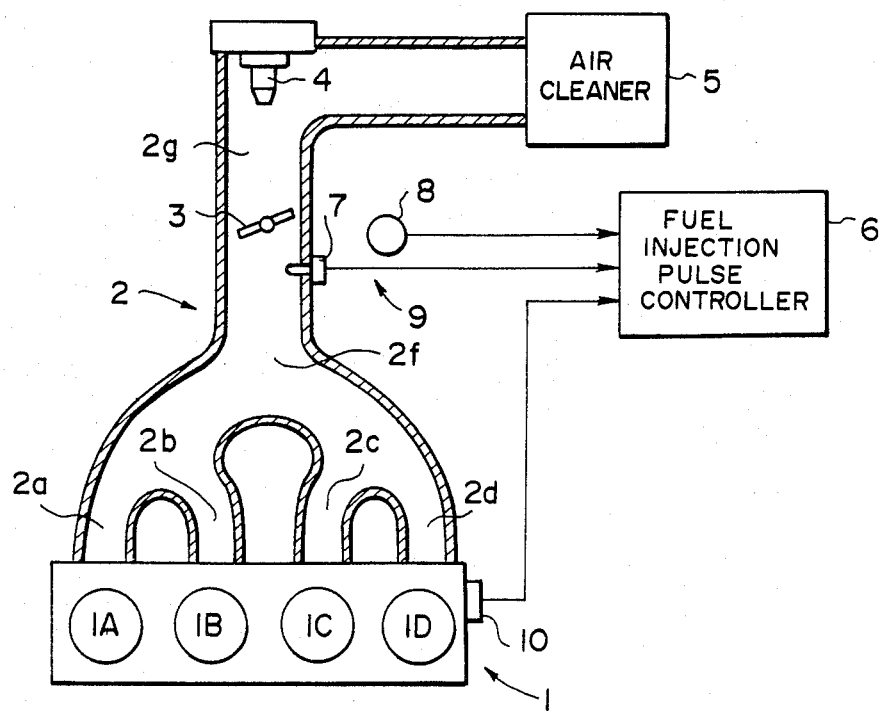
FIG. 1 is a schematic view of the fuel injection system in accordance with an embodiment of the present invention.

FIG. 1 shows a schematic view of an embodiment of the fuel injection system in accordance with the present invention. Referring to FIG. 1, the first to fourth cylinders 1A to 1D are provided in an engine 1 and are connected to intake branch passages 2a to 2d of an intake passage 2. The intake passage 2 consists of a single upstream passage 2g and the four branch passages 2a to 2d branched off therefrom at a branch off part 2f. In the upstream part 2g are provided a throttle valve 3 and a fuel injection valve 4 which is located upstream of the throttle valve 3. The upper end of the upstream passage 2g is communicated with an air cleaner 5.

The upstream passage 2g is bent at the part where the fuel injection valve 4 is located so that the direction of the fuel injection may be aligned with the direction of the intake air flow.

The amount of the injected fuel and the injection timing are controlled by fuel injection pulses output from a fuel injection pulse controller 6. The injection pulse controller 6 receives an output signal from an intake air amount detecter 9 which detects the amount of the intake air based on a signal from a negative pressure sensor 7 provided downstream of the throttle valve 3 and a signal from an engine speed sensor 8. The engine speed sensor 8 detects the engine speed or rotation speed of the engine from ignition signals of the engine. The injection pulse controller 6 further receives a signal from a crank angle sensor 10 which generates standard signals at a predetermined rotation angle of the crank shaft. The fuel injection pulse controller 6 outputs fuel injection pulses proportional to the amount of the intake air based on the signals from said intake air amount detector 9 at predetermined timings based on the standard signals from said crank angle sensor 10. Thus, the fuel injection pulse controller 6 provides injection pulses to the cylinders 1A to 1D at the desired timings for the cylinders respectively in their intake strokes.

Further, the fuel injection pulse controller 6 corrects the injection timings of the injection pulses according to the difference in the air fuel ratio between cylinders 1A to 1D the intake strokes of which are adjacent to each other, whereby the air fuel ratio of the cylinders 1A to 1D is made constant. The cylinders the intake strokes of which are adjacent to each other means the cylinders the intake stroke of one of which follows the intake stroke of the other.

The difference in the air fuel ratio between the cylinders 1A to 1D of the four-cylinder engine 1 will now be explained in detail. When the amount of the intake air is small, the fuel injected through the injection valve 4 is supplied to the cylinders 1A to 1D mainly as a wall surface flow along the wall surface of the intake passage 2. In this case, the fuel supply to the first and fourth cylinders 1A and 1D located at the farthest positions from the branch-off part 2f is small, and the air fuel ratio in the first and fourth cylinders 1A and 1D becomes lean as compared with the air fuel ratio in the second and third cylinders 1B and 1C. When the amount of the intake air is large, on the other hand, the fuel injected out of the injection valve 4 is supplied to the cylinders 1A to 1D mainly by the intake inertia. Accordingly, in this case, the fuel supply becomes small when the direction of the intake air flow greatly changes accompanying the change-over of the intake stroke or ignition among the cylinders 1A to 1D. Therefore, in case that the ignition is made in the order of the first cylinder 1A, the third cylinder 1C, the fourth cylinder 1B and the second cylinder 1B, the intake air flow greatly changes its direction when it changes to the third cylinder 1C and the second cylinder 1B. Consequently, the air fuel ratio in the second and third cylinders 1B and 1C becomes lean as compared with the air fuel ratio in the first and fourth cylinders 1A and 1D.

In view of the above explained fluctuation in the air fuel ratio between cylinders, in this embodiment, the fuel injection pulse controller 6 operates to advance the injection timing of the cylinders having rich air fuel ratio so that a part of the injection fuel to the rich cylinder may be supplied to the lean cylinder the intake stroke of which precedes that of the rich cylinder, thereby equalizing the air fuel ratio of the cylinders. This is based on the discovery of the phenomenon that the air fuel ratio of the cylinder preceding the rich cylinder is lean.

Figure 2A:
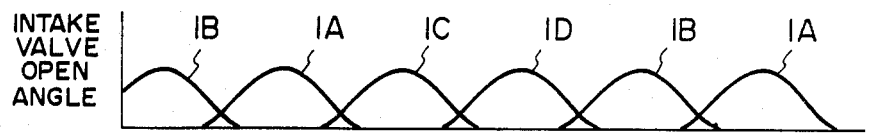
FIGS. 2A to 2E are timing charts showing the timings of various signals in relation to the opening angle of the intake valve.
Figure 2B:
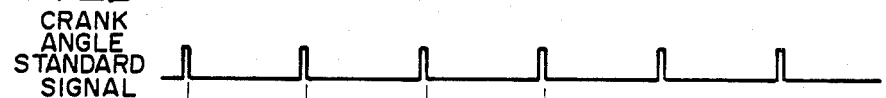
Figure 2C:
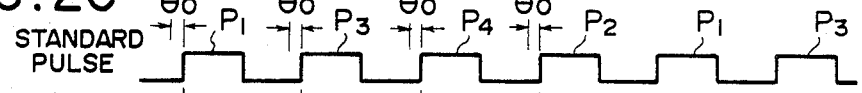

The above operation will be further understood by referring to FIGS. 2A to 2E. As shown in FIG. 2A, the cylinders 1A to 1D are supplied with intake air in the order of ignition and are subject to the intake stroke in the order of the first cylinder 1A, the third cylinder 1C, the fourth cylinder 1D and the second cylinder 1B. Further, crank angle sensor 10 generates standard signals at the crank angle where the intake valve is most opened as shown in FIG. 2B. Based on the above standard signals, the fuel injection pulse controller 6 generates fuel injection pulses P1 to P4 for the cylinders 1A to 1D at the timings a predetermined period before the opening of the intake valves of the cylinders 1A to 1D taking the time for the injected fuel to reach the cylinders 1A to 1D into account as shown in FIG. 2C.

Hence, the fuel injection pulses P1 to P4 are generated with the delay of a predetermined crank angle $\theta°$ from the standard signal as shown in FIG. 2B.

The standard fuel injection pulses P1 to p4 shown in FIG. 2C are for the intermediate intake amount region in which the air fuel ratios of the cylinders 1A to 1D are all equalized by summing up the wall surface flow and the intake inertia. The size or pulse duration of the fuel injection pulses P1 to P4 is determined by the signal from the intake air amount detector 9 and controls the fuel injection duration during which the fuel is injected through the fuel injection valve 4.

Figure 2D:
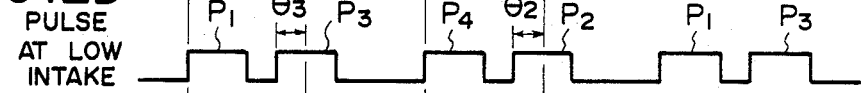

In the low intake region, the air fuel ratio of the first and fourth cylinders 1A and 1D becomes lean. In view of this, as shown in FIG. 2D, the fuel injection timings of the injection pulses P1 and P4 for the lean cylinders 1A and 1D are made aligned with the standard timings as shown in FIG. 2C, and the fuel injection timings of the injection pulses P2 and P3 for the rich cylinders 1B and 1C are corrected to be advanced by the correcting crank angles $\theta_2$ and $\theta_3$ so that the fuel may be injected into these cylinders in advanced timings. By advancing the fuel injecting timings for the rich cylinders 1B and 1C, a part of the injected fuel injected into the rich cylinders 1B and 1C is introduced into the lean cylinders 1A and 1D, whereby the air fuel ratios of the four cylinders 1A to 1D are equalized.

Figure 2E:
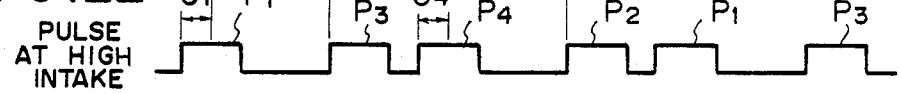

In the high intake region, contrary to the low intake region, the second and third cylinders 1B and 1C become the lean cylinders and the first and fourth cylinders 1A and 1D become rich. Therefore, as shown in FIG. 2E, the fuel injection timings of the fuel injection pulses P2 and P3 for the lean cylinders 1B and 1C are aligned with the standard timings and the fuel injection timings of the injection pulses P1 and P4 for the rich cylinders 1A and 1D are corrected to be advanced by the correcting crank angles $\theta_1$ and $\theta_4$ so that the fuel may be injected into these rich cylinders in advanced timings. By advancing the fuel injection timings for the rich cylinders 1A and 1D, a part of the injected fuel injected into the rich cylinders 1A and 1D is introduced into the lean cylinders 1B and 1C, whereby the air fuel ratios of the four cylinders 1A to 1D are equalized.

Figure 3:
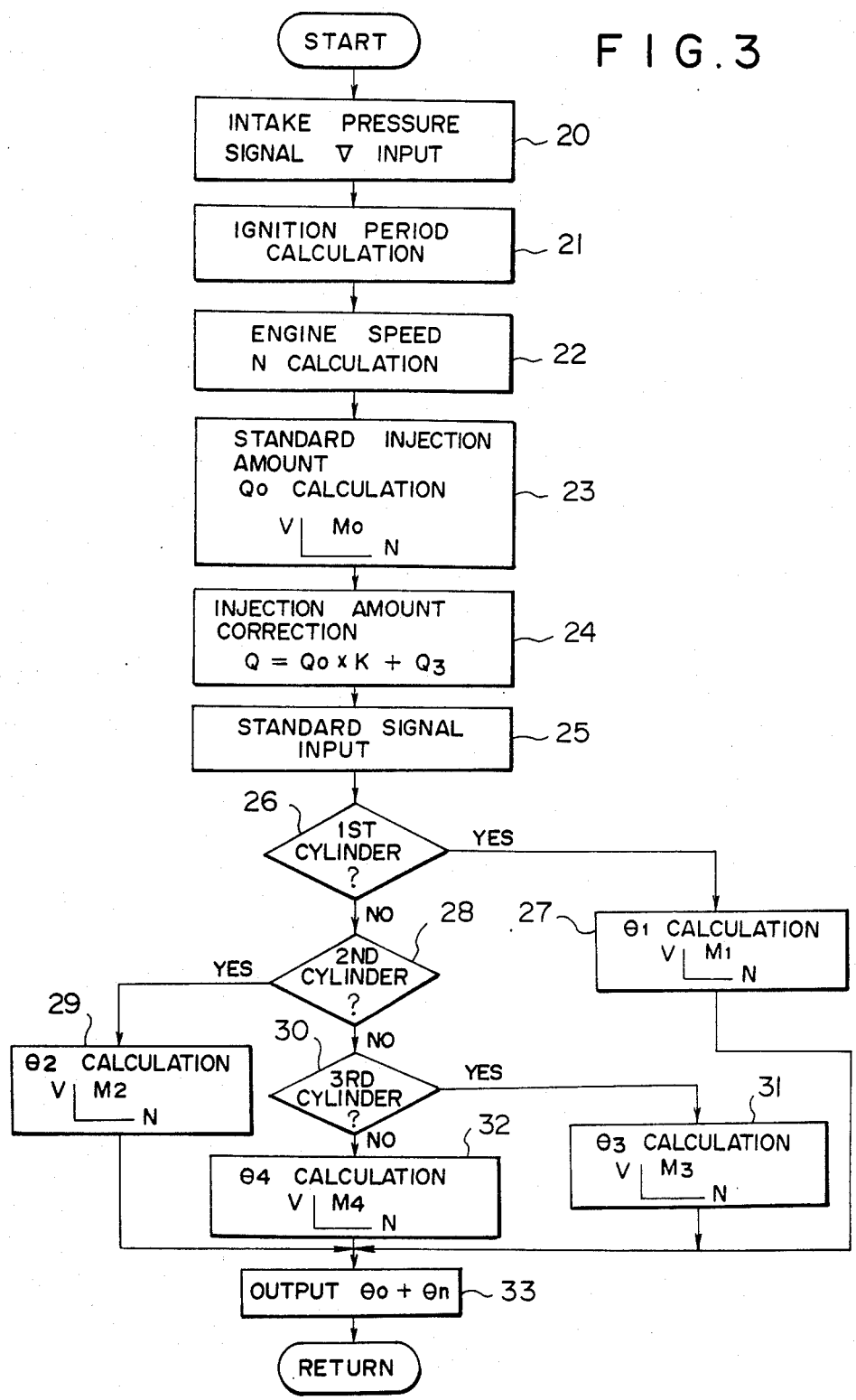
FIG. 3 is a flow chart showing the operation of the fuel injection pulse control means employed in an embodiment of the present invention.

Now the operation of the fuel injection pulse controller 6 will be described with reference to a flow-chart shown in FIG. 3. Referring to FIG. 3, the fuel injection pulse controller 6 first receives a negative pressure signal V from the negative pressure sensor 7 at step 20 when the engine starts. Further, the controller 6 receives the ignition pulses from the engine speed sensor 8 at step 21 and calculates the ignition period therefrom, and then calculates the engine speed (rotation number) N from the ignition period at step 22. Subsequently, at step 23, a basic fuel injection amount $Q_0$ is calculated out by use of a map $M_0$ which memorizes the above engine speed N and the intake negative pressure V. At step 24, the basic fuel injection amount $Q_0$ is multiplied by a water temperature correction coefficient K and added with a battery voltage correction value $Q_3$ to make correction to provide an injection amount Q proportional to the amount of the intake air. Thus, the desirable injection pulse duration is determined.

On the other hand, at step 25, the standard signal is input into the injection pulse controller 6 from the crank angle sensor 10, and at step 26 it is determined if the next injection pulse accordingly the fuel injected next is for the first cylinder 1A or not. In case of YES, the correction crank angle $\theta_1$ for correcting the standard timing for the first cylinder 1A is obtained from a map M1 which memorizes the correction crank angles in accordance with various engine speeds N and the intake air pressure V at step 27. In the map M1, the correction crank angle $\theta 1$ is set to advance the injection timing in case of a high intake region.

In case of NO at step 26, that is when the cylinder is not the first cylinder 1A, it is determined whether the cylinder is the second cylinder 1B or not at step 28. In case of YES at step 28, the correction crank angle $\theta 2$ for correcting the standard timing for the second cylinder 1B is obtained from a map M2 which memorizes the correction crank angles in accordance with the engine speed N and the intake air pressure V at step 29 similarly to step 27. In the map M2, the correction crank angle $\theta 2$ is set to advance the injection timing in case of a low intake region.

Further, in case of NO at step 28 that means the cylinder is neither the first nor the second cylinder, it is determined whether it is the third cylinder 1C or not at step 30. In case of YES at step 30, the correction crank angle $\theta 3$ for correcting the standard timing for the third cylinder 1C is obtained from a map M3 which memorizes the correction crank angles with reference to the engine speed N and the intake air pressure V at step 31 similarly to step 27. In the map M3, the correction crank angle $\theta 3$ is set to advance the injection timing in case of a low intake resion similarly to the case with the second cylinder 1B.

Further, in case of NO at step 30 that means the next cylinder is the fourth cylinder, the correction crank angle $\theta 4$ for correcting the standard timing for the fourth cylinder 1D is obtained from a map M4 which memorizes the correction crank angles with reference to the engine speed N and the intake air pressure V at step 32 similarly to step 27. In the map M4, the correction crank angle $\theta 4$ is set to advance the injection timing in case of a high intake region similarly to the case with the first cylinder 1A.

The correction crank angles $\theta 1$ to $\theta 4$ for correcting the injection timings for the cylinders 1A to 1D calculated at the steps 27, 29, 31 and 32 are added to the basic delay crank angle $\theta_0$ for the standard signal input at step 25 at step 33. Thus, desirable fuel injection pulses P1 to P4 of the predetermined pulse duration are obtained and output to the fuel injection valve 4 to conduct fuel injection. The above-described operation explained with reference to FIG. 3 is repeated for the successive operations or rotations of the engine 1.

In accordance with the above-described correction of the fuel injection timings, the fuel is properly supplied to the cylinders 1A to 1D through the intake passage 2 at corrected timings in such a way that the air fuel ratios in the cylinders are all equalized regardless of the change in the intake pressure V or the engine speed N.

The above-described embodiment of the invention can be modified in various ways. For example, the correction rate can be changed in accordance with the engine load. That is, the correction rate may be lowered when the load is low. Further, the number of the cylinders is not limited to the above mentioned four, but may be 3, 6 or 8, for example. In any type of modifications, the fuel injection timings should be corrected to make the air fuel ratios of the cylinders the intake stroke of which is adjacent to each other equalized.

Figure 4:
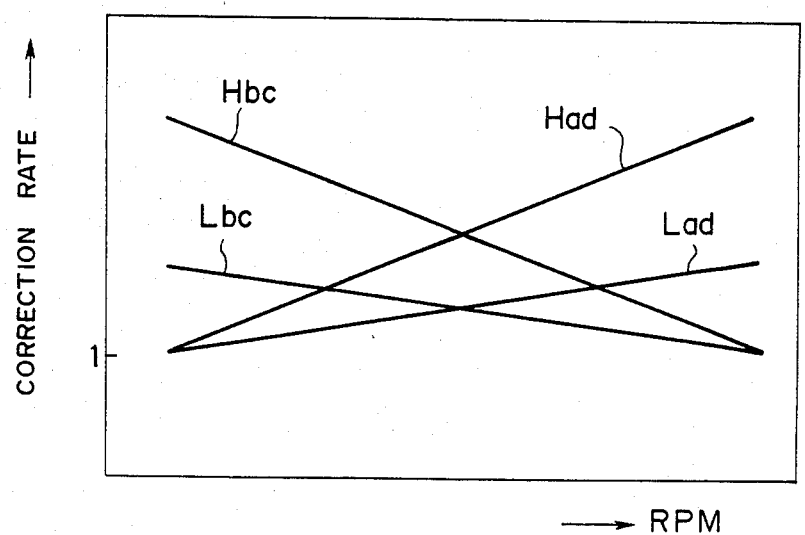
FIG. 4 is a graph showing the change or variation of the correction rate at which the timing is corrected in view of the change in load and/or engine speed.

The above-mentioned modification in which the correction rate is lowered when the load is low will be described in more detail with reference to FIG. 4. The graph shown in FIG. 4 represents the correction rates for cylinders 1A to 1D that are to be changed according to the change in the load and varied according to the engine speed (rpm). The abcissa represents the correction rate. The curve Had shows the correction rate for the cylinders 1A and 1D at high load, the curve Hbc shows the correction rate for the cylinders 1B and 1C at high load, the curve Lad shows the one for 1A and 1D at low load and the curve Lbc shows the one for 1B and 1C at low load. By lowering the correction rate at the low load, a more appropriate correction of timings and accordingly more precise equalization of the air fuel ratio can be effected.

Figure 5:
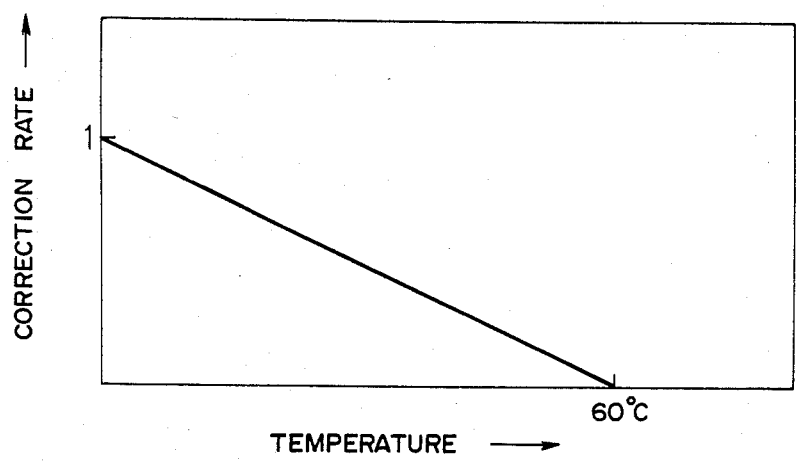
FIG. 5 is a graph showing the change in the correction rate at which the timing is corrected in view of the change in temperature.

Further, it may be possible to modify or correct the correction rate in accordance with the temperature so that the correction may be made only when the temperature is below a predetermined value, e.g. 60° C. and the correction rate may be decreased as the temperature increases. Such an example is shown in FIG. 5. In FIG. 5, the abscissa represents the correction rate and the ordinate represents the temperature.

Furthermore, it should be understood that the correction of the fuel injection timing may not be of the type to advance the injection timing for the rich cylinders as employed in the above-described embodiment, but may be of the type to retard the injection timing for the rich cylinders to that the rich intake air fuel mixture may be partly supplied to the lean cylinders. Further, all the cylinders may be subject to the correction of injection timings so that a part of the rich air fuel mixture may be supplied to the lean cylinders.

As for the intake air amount detector 9 which uses a combination of a negative pressure sensor 7 and an engine speed sensor 8, it may be replaced by an air-flow meter. It will further be understood that the control system which employs maps of the intake pressure and the engine speed may be replaced by a system employing an air fuel ratio sensor ($0_2$ sensor) to detect the actual air fuel ratio directly.

We claim:

1. A fuel injection system for four-cylinder engines having an air intake passage consisting of a collective passage, the downstream end of the collective passage forming a first branch-off part; a pair of branch passages, the upstream ends of said pair of branch passages connected to said first branch-off part and the downstream ends of said pair of branch passages forming a pair of second branch-off parts; and two pairs of second branch passages, each pair of second branch passages extending from a respective second branch-off part, each second branch passage connected to a respective cylinder, the cylinders connected to a respective pair of second branch passages having intake strokes adjacent to each other; said system comprising:

a fuel injection valve provided in said collective passage;

an intake air flow detecting means for detecting the amount of intake air flow into said cylinders and generating a signal representative thereof;

a standard signal generating means for generating standard signals synchronized with rotation of the engine;

a fuel injection pulse control means, which receives signals from said intake air flow detecting means and said standard signal generating means, for forwarding to said fuel injection valve fuel injection pulses of a pulse duration proportional to said intake air flow to said cylinders in the intake stroke thereof at a predetermined timing determined by said standard signals; and and an injection timing correction means for correcting said predetermined timing for one cylinder of each pair of cylinders connected to the same second branch-off part when said intake air flow is lower than a predetermined value and correcting said predetermined timing of the other cylinder of each pair of cylinders connected to the same second branch-off part when said intake air flow is higher than said predetermined value, the intake stroke of said one cylinder of each pair of cylinders being preceded by that of a cylinder of the other pair of cylinders.

2. A fuel injection system for four-cylinder engines as defined in claim 1, wherein said fuel injection pulse control means corrects said predetermined timings in terms of a correction rate which is changed according to the load exerted on the engine.

3. A fuel injection system for four-cylinder engines as defined in claim 2, wherein said correction rate is made small in case of a low load and made large in case of a high load.

4. A fuel injection system for four-cylinder engines as defined in claim 1, wherein said standard signal generating means is a crank angle sensor which generates standard signals at every predetermined crank angle of the engine.

5. A fuel injection system for four-cylinder engines as defined in claim 1, wherein said fuel injection pulse control means corrects said predetermined timings in terms of a correction rate which is decreased as the temperature of the engine rises.

6. A fuel injection system for four-cylinder engines as defined in claim 5, wherein said correction rate is generally decreased as the temperature rises.

7. A fuel injection system for four-cylinder engines as defined in claim 6, wherein said correction rate becomes zero when the engine is sufficiently warmed up.

8. A fuel injection system for four-cylinder engines as defined in claim 1, wherein said cylinders are sequentially designated cylinders 1, 2, 3 and 4 and said four cylinders are ignited in the order of 1-3-4-2.

9. A fuel injection system for four-cylinder engines as defined in claim 1, wherein said injection timing correction means advances said fuel injection timings from said predetermined timings.

10. A fuel injection system for four-cylinder engines as defined in claim 9, wherein said fuel injection pulse control means corrects said predetermined linings in terms of a correction rate which is decreased as the temperature rises.

11. A fuel injection system for four-cylinder engines as defined in claim 10, wherein said correction rate is generally decreased as the temperature rises.

12. A fuel injection system for four-cylinder engines as defined in claim 11 wherein said correction rate becomes zero when the engine is sufficiently warmed up.

13. A fuel injection system for four-cylinder engines as defined in claim 1, wherein said fuel injection pulse control means corrects said predetermined timings in terms of a correction rate which is changed according to the load exerted on the engine.

14. A fuel injection system for four-cylinder engines as defined in claim 13, wherein said correction rate is made small in case of a low load and made large in case of a high load.

* * * * *